Figure 1A:
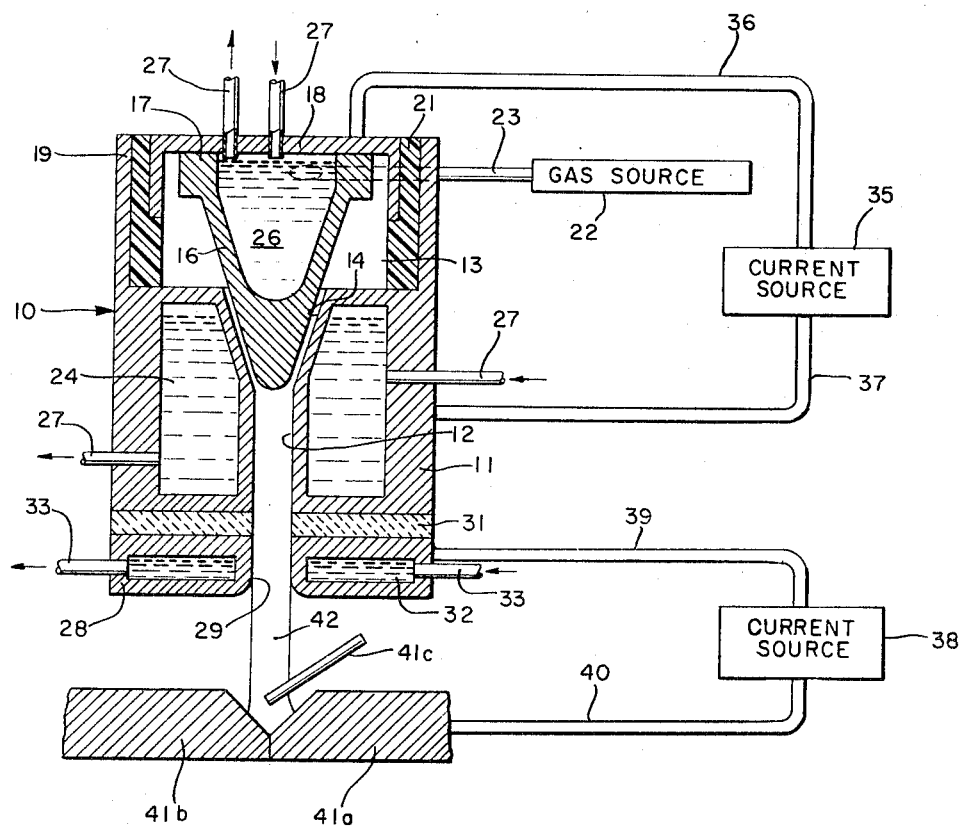

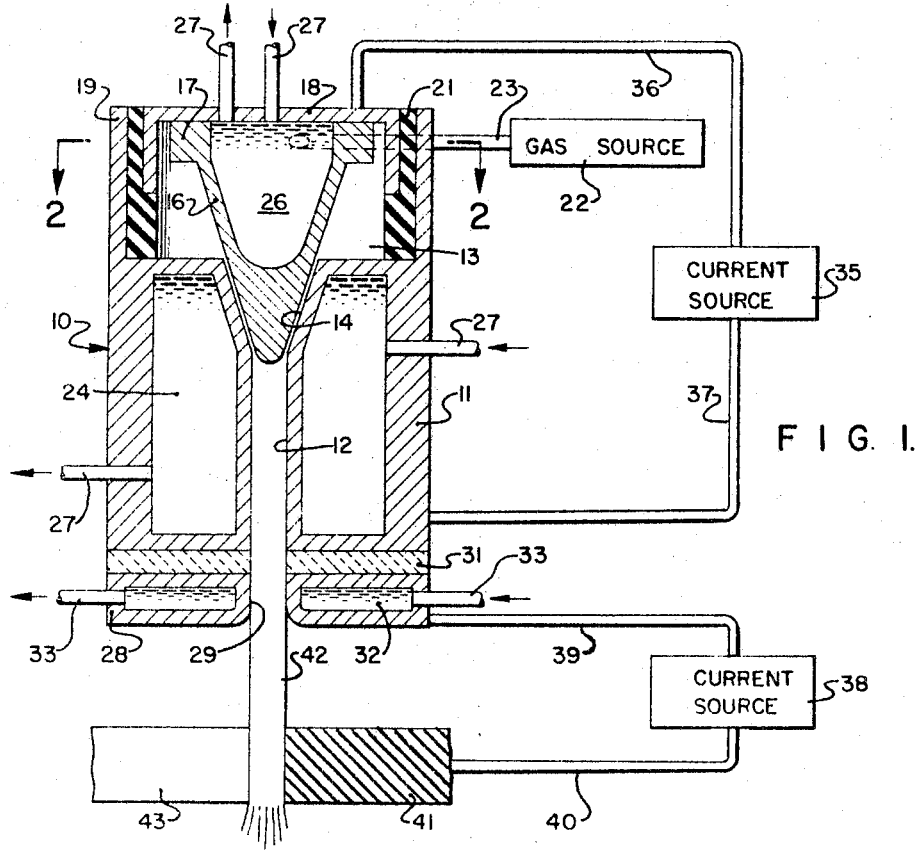
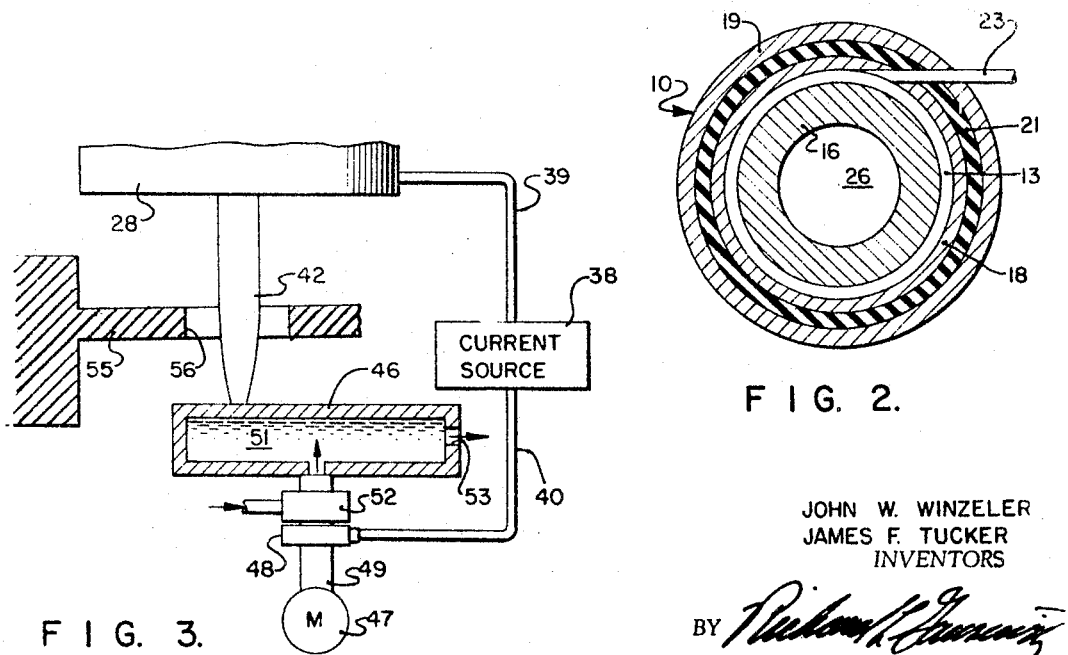
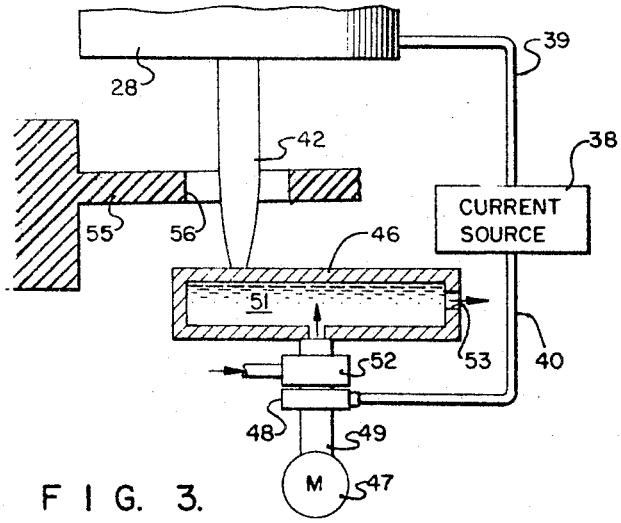

March 28, 1967     J. W. WINZELER ETAL     3,311,735
APPARATUS AND METHOD FOR GENERATING HEAT
Original Filed May 22, 1961     2 Sheets-Sheet 2

JOHN W. WINZELER
JAMES F. TUCKER
INVENTORS.

ATTORNEY.

United States Patent Office 3,311,735
Patented Mar. 28, 1967

3,311,735
APPARATUS AND METHOD FOR
GENERATING HEAT
John W. Winzeler and James F. Tucker, Santa Ana, Calif., assignors to Giannini Scientific Corporation, Santa Ana, Calif., a corporation of Delaware
Continuation of application Ser. No. 111,763, May 22, 1961. This application May 21, 1964, Ser. No. 369,188
6 Claims. (Cl. 219—121)

This invention relates to an apparatus and method for heating a workpiece for cutting, welding, and other purposes. This application is a continuation of patent application Serial No. 111,763, filed May 22, 1961, for Apparatus and Method for Generating Heat, now abandoned.

An object of the invention is to provide an apparatus and method for introducing a great amount of heat into a workpiece in a highly efficient manner which is susceptible of accurate control.

Another object is to provide a method and apparatus for cutting and welding metallic workpieces by passing a large electric current through a stream of plasma from a plasma torch, such current being independent of the current passed through the arc of such torch.

Another object is to provide a method and apparatus for effecting machining of a workpiece by regulating the voltage impressed between such workpiece and an electrical plasma-jet torch of the transferred-arc type.

A further object is to provide a method and apparatus for effecting highly accurate electric-arc machining, and effecting punching of holes.

Another object is to provide an electric arc apparatus in the nature of a band saw.

Another object is to provide a workpiece-heating method and apparatus employing at least two independent electrical circuits and utilizing either A.C. or D.C., or both A.C. and D.C.

These and other objects and advantages of the invention will be more fully set forth in the following specification and claims, considered in connection with the attached drawings to which they relate.

In the drawings:

FIGURE 1 is a schematic longitudinal central sectional view illustrating an apparatus, constructed in accordance with the present invention, as employed in cutting a metallic workpiece;

FIGURE 1a corresponds to FIGURE 1 but illustrates the welding of a pair of workpieces;

FIGURE 2 is a transverse section taken on line 2—2 of FIGURE 1 and illustrating the tangential introduction of gas into the apparatus; and FIGURE 3 is a schematic view, partially in side elevation and partially in section, illustrating an arc apparatus which operates in the manner of a band saw.

Referring first to the embodiment of FIGURES 1 and 2, an electrical plasma-jet torch is indicated generally at 10 and has a non-consumable metal nozzle electrode 11 formed with an elongated cylindrical passage or opening 12. The upper end of passage 12 communicates with a cylindrical gas vortex chamber 13 having a frustoconical central portion or extension. The frustoconical wall 14 of such central portion or extension merges, at its narrow end, with the wall of passage 12.

The non-consumable metal back electrode 16 of the illustrated torch is conical in shape, the cone angle corresponding generally to that of wall 14. The tip of the back electrode is disposed in the frustoconical extension of vortex chamber 13, being spaced from wall 14 to form a frustoconical channel therebetween. The main body of the back electrode is disposed in the main or relatively large portion of vortex chamber 13, and has a radial flange 17 the peripheral wall of which is cylindrical in shape.

Flange 17 seats sealingly against the bottom of an inverted metal cup 18. The side wall of cup 18 is telescoped into a generally tubular end portion 19 of nozzle electrode 11, there being an insulating sleeve 21 provided between the cup wall and the tubular portion 19 in order to maintain the nozzle and back electrodes insulated from each other.

The internal surface of the cup side wall, and the exposed interior surface of insulating sleeve 21, are flush with each other and form the cylindrical wall of vortex chamber 13. Such cylindrical wall has a diameter substantially greater than the cylindrical wall of flange 17, in order to permit introduction of gas therebetween as will next be described.

Gas is introduced into chamber 13 from a suitable gas source which is represented schematically at 22. The gas conduit 23 from source 22 communicates tangentially (FIGURE 2) with chamber 13 at a point located radially-outwardly from flange 17. A suitable gas, such as nitrogen, is thus introduced tangentially so that it will flow vortically around the back electrode 16. The gas then flows vortically and helically through the channel around the tip of the back electrode, and then flows vortically and helically through nozzle passage 12.

The nozzle electrode 11 is formed with an annular cooling chamber 24 around the nozzle passage and also around wall 14. Water is passed through such chamber, and through a cooling chamber 26 in back electrode 16, by means of various conduits which are indicated at 27.

Mounted coaxially of nozzle electrode 11, in spaced relationship from the lower end thereof, is an additional non-consumable electrode 28 of annular shape. Such electrode, which may be formed of copper, tungsten or the like, has an opening 29 the diameter of which corresponds generally to that of the nozzle passage 12 with which it is registered. The additional electrode 28 is insulated from nozzle electrode 11 by means of a disc 31 formed of a suitable heat-resistant ceramic, such disc having an opening registered with and corresponding to the opening 29, or else having an opening substantially larger than opening 29. The additional electrode is formed with an annular coolant chamber 32 through which water is passed by means of conduits 33.

A first current source 35 is connected through leads 36 and 37, respectively, to the cup 18 and to nozzle electrode 11. Since the current in cup 18 flows through the adjacent back electrode to the tip thereof, an electric arc may thus be maintained in passage 12 between the tip of back electrode 16 and the wall of the passage 12. The current source 35 may be a source of either D.C. or A.C., preferably D.C. so that continuous ionization takes place, and should be adapted to deliver relatively large currents although not necessarily as large as those delivered by a second current source which is indicated at 38.

The second source 38 is connected, through leads 39 and 40, respectively, between the additional electrode 28 and the work 41, such work being indicated in FIGURE 1 is a metal plate to be cut. The second source 38 is adapted to deliver extremely large currents and may comprise a D.C. source or an A.C. source, either single or multi-phase. Furthermore, the second source may comprise a circuit (such as containing a capacitor or bank thereof) adapted to deliver a large pulse of current at predetermined time intervals.

*Description of various methods, particularly relative to the embodimet of FIGURES 1–2*

A stream of hot ionized gas is generated by the electrical plasma-jet torch 10, namely by introducing gas tangentially from source 22 into the gas vortex chamber 13 and thence through the frustoconical chamber adjacent wall 14 to the passage or opening 12 in the nozzle electrode. The combination of such gas flow and the electric arc, which is maintained in passage 12 due to application of voltage from source 35, generates a high-velocity stream of ionized plasma as indicated at 42. Such plasma is directed against the metallic workpiece 41, as illustrated in FIGURE 1, and the second current source 38 is applied to maintain a second and separate electric arc through the plasma 42 between the workpiece and the additional electrode 28.

In the showing of FIGURE 1, the method is employed to effect cutting of the workpiece 41, the kerf being indicated at 43. Cutting is accomplished by making the voltage of source 38 sufficiently high that the arc and plasma reach clear to the lower surface of the workpiece 41 to cut the same, the dross being ejected downwardly as indicated.

In order to reduce the cost of electricity, and as previously indicated, the current source 38 may be a source of A.C. power, such as three phase. Many hundreds of amperes of current may thus be caused to flow through the external plasma stream 42 to the workpiece 41 without in any way affecting the electrodes 11 and 16 of torch 10.

It is a feature of the invention that the apparatus may be employed to effect machining of a workpiece, for example a metal workpiece being rotated in a lathe. This is accomplished by progressively varying the voltage impressed by source 38 between electrode 28 and the workpiece 41. Such variation in voltage changes the length of the plasma jet-arc 42 to regulate the depth of cut in the workpiece. Thus, when the workpiece in a lathe is to be cut to a relatively small diameter, the voltage is increased. Conversely, the voltage is reduced when the diameter is to be relatively large. Machining is thus effected in a highly simple and effective manner and without the necessity of moving the apparatus 10–28 toward or away from the work.

To heat the workpiece 41 or to weld the same, as distinguished from cutting the workpiece, the amount of electrical power introduced from source 38 is normally reduced. The work, comprising two abutted metal plates, may be either negative or positive.

It is to be understood that when the method and apparatus are employed in welding a workpiece, filler metal may be introduced into the molten weld puddle (in the form of wire, powder, etc.) from any conventional source. Also, various fluxes, shields of inert gas, etc., may be employed in conventional manner. Referring to FIGURE 1a, the workpieces to be welded are numbered 41a and 41b, the filler wire being indicated at 41c. Except as indicated, the numbers in FIGURE 1a correspond to FIGURE 1.

As previously stated, it is a feature of the invention that the current source 38 may be a pulse means, such as a bank of capacitors and associated triggering and charging apparatus. In such a system, the current generated by the discharging capacitors passes down the stream of plasma 42, so that the location of the point of impingement against the workpiece 41 is accurately determined and controlled. Cutting, heating and welding may thus be controlled in a highly accurate manner. For example, the discharge of a very large capacitor means is operative to punch a hole in the workpiece 41, the location of the hole being accurately determined. Furthermore, repetitive discharging of capacitor means may effect accurate spark or arc-machining of square holes, and other irregular shapes, or irregular gouges or grooves.

*Embodiment of FIGURE 3*

The apparatus of FIGURE 3 is identical to that of FIGURES 1 and 2 except that the metallic workpiece 41 is replaced by a metal disc 46 (formed of copper, tungsten, etc.) which is rotated at a substantial rate of speed by an electric motor 47. The current source 38 is connected between electrode 28 and the disc 46, the current connection to the disc being through a slip ring 48 on the electrically-conductive shaft 49 which associates the motor 47 with the center of the disc.

Disc 46 is formed with a coolant chamber 51 through which water is passed by means of a suitable inlet fitting 52 adapted to introduce water into the shaft 49 regardless of the rotated position of the latter. From fitting 52, the water flows into chamber 51 and then discharges (into an unshown collector) through an opening 53 at the periphery of the disc. Alternatively, the discharge may be through the shaft 49.

The apparatus further comprises a horizontal support plate 55 having an opening 56 therein through which the plasma and arc 42 may pass. It is to be understood that the plate 55 is suitably supported in fixed relationship, although it may be adjustable to various heights. The opening 56 is sufficiently large that the material forming the plate 55 will not be melted.

In performing the method with the apparatus of FIGURE 3, motor 47 is employed to rotate the disc 46, and water is passed therethrough. The apparatus described relative to FIGURES 1 and 2 is so disposed that the jet and arc 42 pass through the opening 56 to a peripheral portion of the upper surface of the disc 46. The speed of rotation of disc 46, and the amount of water cooling, are so correlated to the power supplied from current source 38 that the disc 46 is not melted. An object to be cut is then disposed on the support 55 and is moved across the jet 42 in the manner of the movement of a workpiece in a band saw or jig saw.

In the described manner, both conductors and nonconductors may be readily cut without the necessity of making electrical connection thereto. Suitable means may be provided to remove the dross and prevent undesired buildup thereof on the electrode 46.

It is to be understood that, in the embodiments of FIGURES 1–3, an additional A.C. or D.C. current source may be connected between electrode 28 and nozzle electrode 11, thereby adding further energy to the plasma which forms the jet 42. It is also to be understood, relative to the embodiments of FIGURES 1–3, that source 38 may be a source of high-frequency current—such as in the radio frequency range. R.F. current may also be superimposed on a D.C. or low-frequency A.C. source 38. Such use of high frequencies produces an effect in the nature of a mechanical vibration, and aids in breaking down the scale which is present on the surface of the work.

*Specific examples*

The following is a specific example of the situation in which the embodiment of FIGURES 1 and 2 is employed for cutting. The workpiece, which may comprise a mild steel plate three inches thick, is disposed about one-quarter inch from electrode 28. First current source 35 is caused to supply 1,000 amperes D.C. at 36 volts, the nozzle electrode being positive with respect to the back electrode. Second current source 38 is caused to supply 1,000 amperes at 40 volts, either A.C. or D.C. (work positive). The gas source 22 may be caused to supply argon at a rate of about 30 cubic feet per hour.

The following is a specific example of the situation in which the embodiment of FIGURES 1 and 2 is employed for welding. Two mild steel plates, each one-half inch thick, are butted against each other and so disposed that the abutted edges are about one-quarter inch from electrode 28. First current source 35 is caused to supply 250 amperes D.C. at 25 volts, the nozzle electrode being positive with respect to the back electrode. Second current source 38 is caused to supply 125 amperes at 60 volts, either A.C. or D.C. (work positive). The gas source 22 is caused to supply argon at a rate of about 30 cubic feet per hour. Filler metal may be supplied in power or stick (wire) form. A blanket of granular flux may be disposed along the seam, or gas-shielding techniques may be employed.

The apparatus employed relative to both specific examples may have a nozzle diameter of about one-quarter inch. A high-frequency source, for example producing 100 kilocycles, may be employed as previously indicated.

Various embodiments of the present invention, in addition to what has been illustrated and described in detail, may be employed without departing from the scope of the accompanying claims.

We claim:

1. Apparatus for heating a metal workpiece, which comprises an electrical plasma-jet torch having a back electrode and a nozzle electrode, means to pass gas between said back and nozzle electrodes and through the nozzle opening in said nozzle electrode to the vicinity of said workpiece, means to maintain an electric arc between said back and nozzle electrodes to thereby effect heating and ionization of said gas, a non-consumable additional electrode disposed between said nozzle electrode and said workpiece in spaced relationship from said workpiece, said additional electrode being insulated from said nozzle electrode and having an opening therein through which said ionized gas passes in traveling from said nozzle electrode to the vicinity of said workpiece, and means independent of said back electrode to maintain a second arc between said adidtional electrode and said workpiece through said ionized gas, said last-named means comprising means to effect between said additional electrode and said workpiece a pulse discharge of short duration.

2. Electrical apparatus in the nature of a band saw, comprising an electrical plasma-jet torch adapted to discharge a stream of hot ionized gas, an additional electrode spaced from said torch and in such relationship thereto that the ionized gas emanating from said torch reaches the vicinity of said additional electrode, means to maintain a high-current electric arc between said torch and said additional electrode through said ionized gas, and means to prevent rapid deterioration of said additional electrode.

3. The invention as claimed in claim 2, in which means are provided between said torch and said additional electrode to support a workpiece, said means being adapted to permit passage of said ionized gas and said arc to said additional electrode.

4. The invention as claimed in claim 2, in which said arc means includes a current source connected between a front electrode of said torch and said additional electrode.

5. A method of effecting accurate metal-removal operations relative to a workpiece, which comprises directing a stream of ionized gas from an electrical plasma-jet torch to the vicinity of an electrically conductive workpiece at a precisely located portion of said workpiece, and discharging a large pulse of current through said gas to said portion of said workpiece to effect removal of a quantity of metal from said portion of said workpiece.

6. A method of melting a portion of an electrically-conductive workpiece, which comprises employing an electrical plasma-jet torch to direct a stream of plasma to the vicinity of an electrically-conductive workpiece, and effecting flow of a high-frequency current through said stream of plasma and in a circuit including said workpiece, said high-frequency current aiding in the removal of scale from said workpiece.

References Cited by the Examiner

UNITED STATES PATENTS

| | | | |
|---|---|---|---|
| 2,806,124 | 9/1957 | Gage | 219—121 |
| 2,858,411 | 10/1958 | Gage | 219—75 |
| 2,874,265 | 2/1959 | Reed et al. | 219—121 |
| 2,929,952 | 3/1960 | Giannini | 313—231 |
| 2,945,119 | 7/1960 | Blackman | 219—123 |
| 2,972,698 | 2/1961 | Dana et al. | 313—231 |
| 3,149,222 | 9/1964 | Giannini et al. | 313—231 X |

JOSEPH V. TRUHE, *Primary Examiner.*